Patented Aug. 15, 1933

1,922,484

UNITED STATES PATENT OFFICE

1,922,484

EXTRACTING OIL FROM ANIMAL TISSUE AND THE LIPOID SUBSTANCES BY PAPAIN DIGESTION

Leslie William Mapson and John Thomson MacCurdy, Cambridge, and Harold Omar Nolan, London, England, assignors to Cambio Products Limited, London, England, a British Company No Drawing. Application August 15, 1932, Serial No. 628,892, and in Great Britain July 23, 1931.

2 Claims. (Cl. 87—6)

This invention comprises improvements in or relating to the manufacture of concentrated edible products, particularly the preparation of such concentrated products from protein and connective tissue, and the separation of fats and fatty substances from the tissues in which they occur.

A process according to the invention for the manufacture of a concentrated edible extract from protein and connective tissues or for the separation of fats comprises the step of digesting the material with the juice, leaves or sap of the papaw plant, or a preparation thereof preferably papain (all hereinafter referred to as papain).

According to a feature of the invention, digestion and sterilization of the material may be effected simultaneously by treating them with papain at a temperature at from 60 to 80° C. During the process of digestion, connective tissue is rendered liquid, putrefactive odours are eliminated, the digested material is rendered resistant to putrefactive change and extraction of fats, lipoid- and water-soluble vitamins or other physiologically active principles stored within the cells of the tissue is facilitated.

In a preferred form of the invention the papain is employed in the form of a watery suspension and in a proportion of about ½% to 1/50% reckoned on the weight of the material to be treated.

The use of papain for the digestion of the material has many important advantages.

Firstly, it is possible to effect digestion and sterilization of the material simultaneously, thereby rendering it unnecessary to carry out the process in two stages. Secondly, the use of papain has the great advantage that the connective tissues present in the material are rendered liquid and a gelatinous consistency avoided. A third advantage is that unpleasant odours are eliminated. By using papain it is possible to remove unpleasant odours due to putrefaction, thus making it possible to utilize spoiled meat for animal food. Papain has a preservative action on the digested material for the growth of putrefactive organisms in it is inhibited. Fourthly it is possible to extract fats, lipoid-soluble vitamins, and water-soluble vitamins or other physiological principles, which are present within the cells of the tissue treated by digestion of the cell and nuclear membranes, thus making possible a higher yield of such substances than can be obtained by any method of extraction which does not destroy the cell membranes. Lastly, papain will act on heavily salted as well as on fresh meat.

Methods at present in use for making water-soluble meat extracts fail to produce material having much nutritive value, since they do not contain, in significant quantities, such amino acids (or polypeptides containing these amino acids) as tryptophane, cystin, lysine and histidine, which are essential for the building up of body tissues. This is because the meat, from which the extracts are made, contains these amino acids built up into insoluble proteins and/or enclosed within cell membranes.

The mere addition of water will not dissolve them out and, when heat is applied, all the more complicated proteins are coagulated and rendered even more insoluble than when cold. To obtain a water-soluble extract of high nutritive value it is therefore necessary to break down the cell membranes and to reduce the more complicated proteins containing the essential amino acids to simpler compounds (polypeptides and amino acids) which are water-soluble. This can only be done satisfactorily by enzyme action. Autochthonous enzymes (autolysis) or foreign enzymes, preferably papain may be used to accomplish these ends. The heat employed in papain digestion is not a disadvantage because the papain will cause a breakdown into water-soluble polypeptides and amino acids of the proteins which would be coagulated at this temperature if they remained in their original complex form. The extract thus obtained contains not merely the bulk of the nitrogenous material having high nutritive value but will be more readily assimilated than would be the meat from which it was made. Hence it makes an ideal invalid food. Furthermore the extract shows a remarkable resistance to the growth of putrefactive bacteria and therefore may be kept for long periods without fear of deterioration.

According to a further feature of the invention lipoid-soluble vitamins dissolved in fatty material may be separated from the digested proteins by mechanical means (e. g. centrifuging) by the use of solvents which are immiscible with water (e. g. petrol ether) or by a combination of these means.

If it is desired to obtain oil or fat, such as fish liver oil, tallow, lard, etc., from the digested material, the digested mass is centrifuged with or without the addition of water and at a temperature above the melting point of the fat to be separated or the fat at this temperature is allowed to separate by gravity. If soluble lipoid substances are to be recovered from tissues where the amount of fat is small, a solvent (for example petrol ether) or a liquid fat or a liquid wax is added, the mixture is centrifuged (or allowed to separate by gravity) and the solvent layer which contains the fat is removed and purified if necessary by further extraction. If a concentrated food is desired, the digested material is simply evaporated to a thick paste or completely dried and powdered.

This present process of papain-digestion has an important effect on the flavour and colour and keeping quality of any fats, oils or waxes to be subsequently separated or extracted and intended for human consumption. This refers both to ordinary edible animal fats and to the fats, oils and waxes containing lipoid-soluble physiological principles. Papain renders substances which possess flavour, colour and odour insoluble in fats, oils or waxes at an alkaline pH. Such substances are before treatment with papain soluble in these hydrocarbon compounds at an acid or neutral pH. Thus the manipulation of the pH of the papain-digested material makes possible the utilization of the enzyme for the production of fats, oils and waxes in a purified state. Further the treatment of the material with papain inhibits the development of rancidity in fats and oils thus extracted.

At the same time papain-digestion at an acid pH of 4.5 to 5.0 renders aqueous extracts so obtained at such pH relatively free from obnoxious flavours and odours.

It will be seen, therefore, that subsequent to papain-digestion at a pH of 4.5 to 5.0 both aqueous and fatty extracts which are comparatively free from obnoxious odours, colours and tastes may be made if the pH be carefully adjusted. Such extracts will contain respectively all the water-soluble and fat-soluble physiologically active principles which occur both intra- and extra-cellularly in the tissue; the aqueous extract will also contain the polypeptides and amino acids derived from the digested proteins.

If as is the case in many mammalian and other livers the naturally occurring fats constitute only a small percentage of the total fat of the tissue, then extraction of such physiologically active principles may be facilitated by the addition of either saponifiable or non-saponifiable oils and waxes. The effect of adding alkali subsequent to papain-digestion is to cause saponification of fats that are at present either those naturally occurring in the tissue or those artifically added. The extent of saponification depends on the concentration of the alkali, the temperature and the time elapsing before the oil or wax is extracted. These may be varied within wide limits and thus saponification may be utilized for the concentration of oils and fats containing lipoid-soluble physiologically active principles, although in practice it is found that such saponification or concentration is best carried out after separation of fats or oils. When prolonged saponification for the purpose of concentrating lipoid-soluble substances is used, better results are obtained by the addition of non-saponifiable oils, fats or waxes (for example spermaceti). The saponification can then be allowed to continue until all the saponifiable material has been converted into soaps, when all the lipoid-soluble substances will be concentrated in the non-saponifiable fraction.

Following are descriptions by way of example of methods of carrying the invention into effect:—

Example 1

This example illustrates the preparation of a concentrated food.

One part of liver and four parts of lean meat are minced (water being added if necessary); if desired dilute hydrochloric acid may be added to bring the pH to about 4.5, and the mixture is heated to 80° C. ½% of papain is added and the mixture is stirred for about half an hour until liquefaction occurs. The mixture is then heated up to 100° C. to complete the sterilization. The material is then dried and stored in airtight, dark coloured or opaque containers. This preparation contains concentrated nitrogenous food in a readily assimilable form. It also contains a high concentration of the vitamins and other physiological principles present in liver. This concentration may be modified by varying the amount of liver in proportion to lean meat. By the addition of appropriate amounts of carbohydrates and fats the preparation may be made into a perfectly balanced ration containing all necessary vitamins and physiologically active substances required to maintain health and promote growth with the exception of vitamin "C".

Example 2

Meat is finely comminuted (e. g. by putting through a mincing machine), its acidity is adjusted to pH 4.5 to 5.0 with dilute hydrochloric acid and ½% papain added. The mixture is then heated to 70° C. to 80° C. till liquefaction is thoroughly accomplished. The temperature is then raised to 100° C. in order to bring about sterilization. The sludge is next filtered, while still hot, and the acidity of the filtrate neutralized by addition of sodium hydroxide. Salt, and any desired flavouring matter may then be added to the liquid and the mixture reduced by evaporation to the consistency of thick paste which may be stored in any air-tight container.

Example 3

This example illustrates the use of the process in the extraction of oils fats and waxes from animal tissues or cream in which it is present in relatively large amounts. The liver (or other tissue) is minced finely and brought to a temperature of 70° to 80° C. and to a pH of 4.5 to 5.0. ½% of papain in aqueous suspension is added and digestion allowed to proceed until liquefaction occurs (10 to 30 minutes). The temperature is maintained well above the melting point of the fats to be extracted and the material is centrifuged or allowed to separate by gravity. The addition of further water may facilitate the separation. If improvement of the colour, odour or taste of the product is not an important consideration, separation of the oil, fat or wax by centrifuging or by simple gravity separation may be carried out immediately after the papain-digestion is complete.

It is important, however, that the separation should always be made at an acid or at an alkaline pH and not at or near the isoelectric point.

Example 4

To extract fats, oils or waxes occurring in small percentage in an animal tissue or the lipoid-soluble substances contained therein the tissue (e. g. mammalian liver) is finely minced and the pH is adjusted to 4.5 to 5.0 by addition of mineral acid. The mass is gradually heated to 70° to 80° C. and a watery suspension of ½% papain is then added and digestion allowed to proceed until liquefaction occurs (10 to 30 minutes). An equal bulk of water is then added and the sludge is filtered hot, the filtrate providing an aqueous extract of polypeptides, amino acids and water-soluble physiologically active principles. To the solid residue is added sufficient water to bring the total volume up to that of the original tissue. Alkali (sodium or potassium hydroxide) is then added to bring the pH to 8.5 to 9. Saponification is allowed to proceed for half an hour and then an oil, fat or wax is added in an amount determined by the concentration of lipoid-soluble substances which is desired, this usually varying between 1 and 10% of the volume of the original tissue. The mixture is agitated for 5 to 15 minutes (the temperature being maintained above the melting point of the added fat) and the mass is then centrifuged or the fat allowed to separate by gravity. The colour and flavour of the product may then be reduced and the concentration of the lipoid-soluble substances increased by further agitation in an aqueous solution of alkali and subsequently washing with distilled water.

It will be observed that in the above examples it is stated that ½% of papain is added. It has, however, been found that it is possible to digest the material completely with a smaller proportion of papain, e. g. about 1/20% and even 1/50%.

It is also found that papain acts best in the presence of cyanogen or sulphydryl compounds, or of certain other accelerators. If material is being used which in itself does not contain such accelerators, they should preferably be added.

By means of the process according to the invention a meat extract of good flavour can be obtained in the remarkably short time of two hours.

The invention includes a concentrated edible extract when made by the special process described herein.

We claim:

1. The process of treating animal tissue containing lipoid substances which comprises digesting the animal tissue with an aqueous solution of papain, the acidity during digestion being approximately pH 4.5 to pH 5, separating the fat from the aqueous digestion products, treating the fat with an alkali to saponify at least a part of the fat, the hydrogen ion concentration during this step being approximately pH 8.5 to pH 9, and then, after saponification, adding approximately 1 to 10 percent of an oil, fat or wax to dissolve lipoid substances from the saponified fat and separating the solution of lipoid substances.

2. The process as in claim 1 wherein the animal tissue is liver.

LESLIE WILLIAM MAPSON.
JOHN THOMSON MacCURDY.
HAROLD OMAR NOLAN.